United States Patent [19]

Mollon

[11] E Patent Number: Re. 31,661

[45] Reissued Date of Patent: Sep. 4, 1984

[54] SPENT NUCLEAR FUEL STORAGE RACKS

[75] Inventor: Leslie Mollon, Southfield, Mich.

[73] Assignee: AAR Corp., Elk Grove Village, Ill.

[21] Appl. No.: 202,492

[22] Filed: Oct. 31, 1980

Related U.S. Patent Documents

Reissue of:

[64] Patent No.: 4,143,276
Issued: Mar. 6, 1979
Appl. No.: 794,955
Filed: May 9, 1977

[51] Int. Cl.[3] ..... G21F 5/00
[52] U.S. Cl. ..... 250/507.1; 250/518.1
[58] Field of Search ..... 250/506, 507, 515, 518; 176/88, 73

[56] References Cited

U.S. PATENT DOCUMENTS

| | | | |
|---|---|---|---|
| 4,024,406 | 5/1977 | Bevilacqua | 250/507 |
| 4,034,227 | 7/1977 | Soot | 250/507 |
| 4,044,267 | 8/1977 | Bevilacqua | 250/507 |

*Primary Examiner*—Bruce C. Anderson
*Attorney, Agent, or Firm*—Donald P. Bush

[57] ABSTRACT

A storage rack in which a plurality of tubular shrouds are assembled together in a checkerboard arrangement, each shroud having side walls arranged to absorb subatomic particles such as neutrons. With this arrangement, spent atomic fuel rods may be assembled in the shrouds and also in the spaces which are surrounded by shrouds, so that each adjacent grouping of fuel rods has interposed therebetween an emission absorbing wall.

3 Claims, 9 Drawing Figures

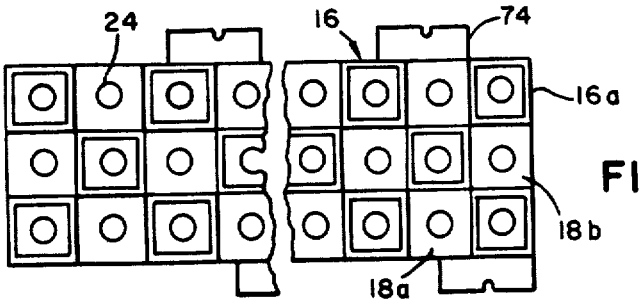
FIG. 2
FIG. 1
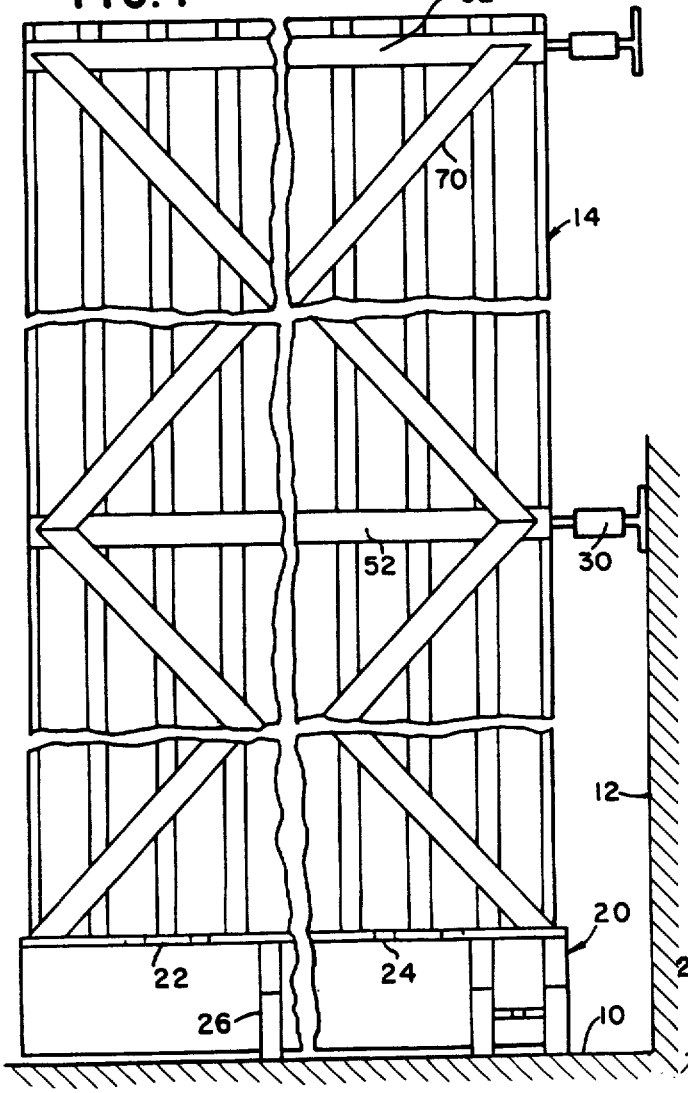
FIG. 3
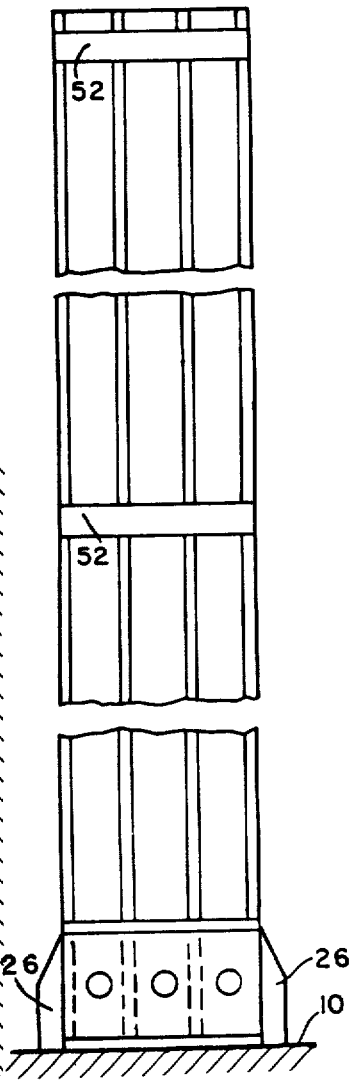

FIG. 7
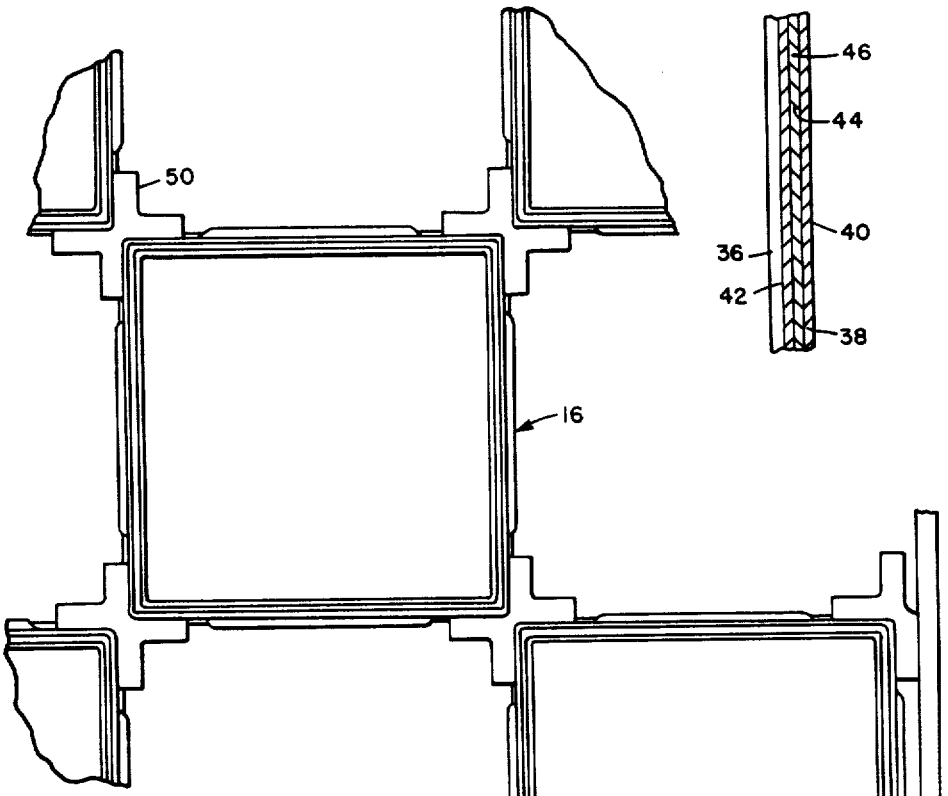
FIG. 4
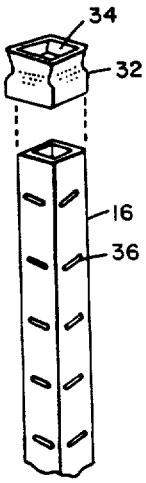
FIG. 6

SPENT NUCLEAR FUEL STORAGE RACKS

Matter enclosed in heavy brackets [ ] appears in the original patent but forms no part of this reissue specification; matter printed in italics indicates the additions made by reissue.

BRIEF SUMMARY OF THE INVENTION

With the growth of nuclear power reactors the disposal of spent fuel rods presents a serious problem. While these fuel rods are referred to as spent, they nevertheless are radioactive and care must be taken to prevent harmful escape of radiation. Also, it is essential that in storing a multiplicity of elongated spent nuclear fuel rods, that the rods be protected against cross radiation.

In general, storage of spent fuel rods is provided in so-called pools of water which may or may not include neutron absorbing agents such, for example, as boron compounds. It has been proposed in the past to assemble together a multiplicity of shrouds which extend vertically in the pool and are substantially completely surrounded by water. Shrouds suitable for this purpose are disclosed in prior U.S. Pat. No. 4,006,362, [and] *of which applicant herein was a joint inventor, the patent being assigned to the assignee of the present application. As disclosed in this prior patent, the shroud comprises inner and outer spaced square tubes of stainless steel and neutron-absorbing panels in the spaces between the inner and outer side walls of the tubes at each side thereof. There is also provided* a storage rack for supporting a multiplicity of such shrouds is disclosed in my copending application Ser. No. 730,216.

In accordance with the present invention, a multiplicity of elongated tubular shrouds are rigidly interconnected in a checkerboard arrangement so that spent fuel rods may be received in each shroud tube and at the same time a spent fuel cell may be received in a space surrounded on three or four sides by a neutron absorbing wall of an adjacent shroud tube. Thus, cross transmission of radiation between bundles of fuel cells which are stored adjacent to each other is effectively prevented. Moreover, by the present arrangement the number of shroud tubes required to receive a given number of spent fuel cell bundles is greatly reduced. For example, an assembly made up of three rows of shrouds in which the shrouds are arranged in a checkerboard arrangement and in which the number of shrouds or spaces in a single row, for example 13, will receive 39 bundles of fuel cells, while requiring only 20 shrouds. It will be understood that the shrouds which are adjacent a side wall of the pool do not require shielding, since cross radiation is not a problem.

Described in general terms, the checkerboard arrangement of tubes is provided by employing one or more egg crate frames formed of a lattice of crossing strips. In addition, adjacent corners of diagonally adjacent shrouds are connected together by permanent rigid fastening elements such, for example, as specially shaped brackets welded to the corners of diagonally adjacent tubes. The entire assembly may be rendered rigid by exterior diagonal braces, and the assembly of shrouds may be supported on a floor plate having a multiplicity of openings arranged to communicate with the open bottom of each of the shrouds.

With this arrangement the number of spent fuel rods or bundles of such rods adapted to be safely stored in a pool is increased and at the same time obvious economies are accomplished due to the reduction of the number of shielded shrouds required.

BRIEF DESCRIPTION OF THE DRAWINGS

FIG. 1 is a side elevation of a spent nuclear fuel storage rack.

FIG. 2 is a plan view of the rack shown in FIG. 1.

FIG. 3 is a side elevation of the rack shown in FIG. 1.

FIG. 4 is an enlarged plan view of a portion of the rack.

FIG. 6 is a perspective view of a portion of a shroud tube.

FIG. 7 is a fragmentary section through a shroud tube;

DETAILED DESCRIPTION

Figure 5:
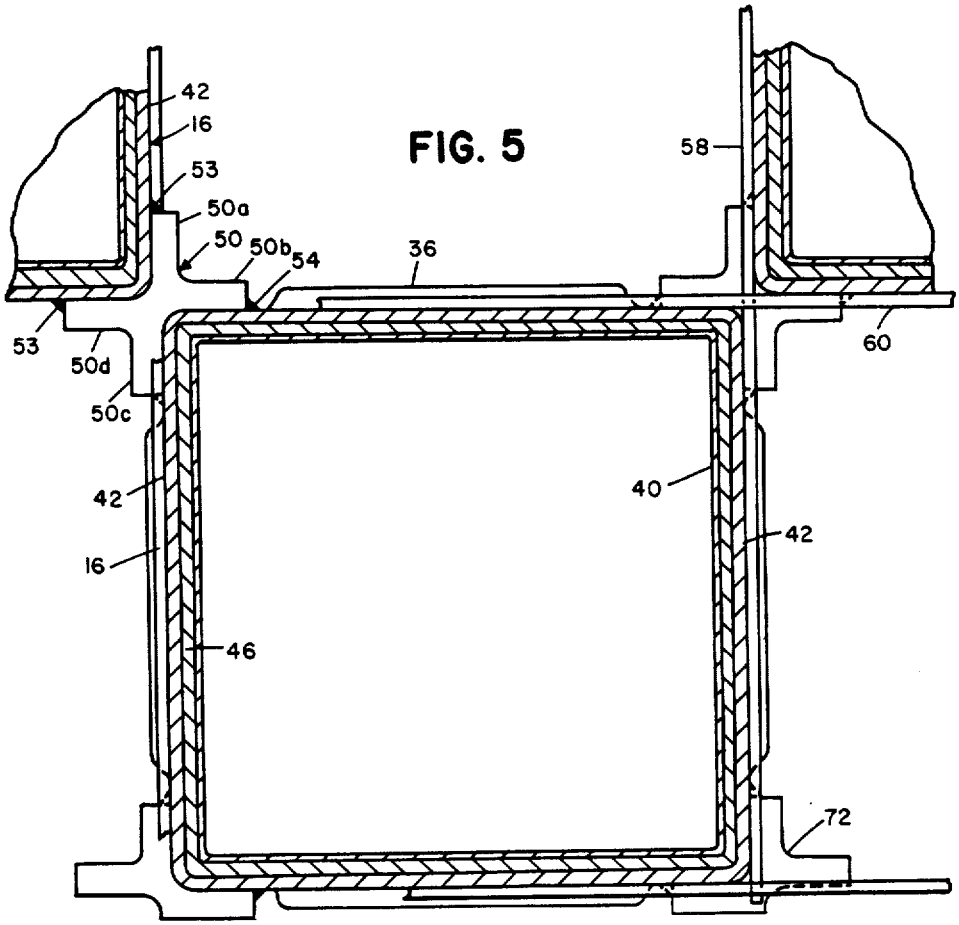
FIG. 5 is a still further enlarged cross sectional view through one shroud tube showing its connection to two adjacent shroud tubes.

Referring first to FIGS. 1 to 3, there is shown a portion of a pool formed by a bottom wall 10 and a side wall 12, the pool being filled with water to a point adjacent its top. The water within the pool, as is well understood, may include a neutron absorbing agent such, for example, as compounds containing boron or other neutron absorbing elements.

The rack indicated in its entirety at 14 is made up of an assembly of elongated hollow square cross section tubular shrouds 16 arranged in a checkerboard arrangement as best illustrated in FIG. 2 where it will be observed that spaces 18 are provided which are surrounded on three or four sides by shrouds. It is important that fuel rods received in one shroud tube 16 or intervening storage space 18 are protected against cross radiation between the fuel cells in the adjacent shroud tubes and storage spaces. It will be observed that fuel cells within the shroud tube 16a at the upper right-hand corner of FIG. 2 are protected against cross radiation from fuel cells received in space 18a to the left of the fuel cell 16 and the space 18b to the bottom of the fuel cell 16 as seen in FIG. 2. Thus the expense of providing a separate fuel cell at the location of spaces 18 is avoided.

The assembly of shrouds making up a rack may be changed to suit circumstances such as, for example, the dimensions of the pool. In FIG. 2 the rack is illustrated as made up of three rows of alternated shrouds and empty spaces extending horizontally in the figure, the shrouds in each adjacent row being staggered to provide the checkerboard arrangement which characterizes the present invention. It is contemplated that the racks may be assembled together in the desired configuration and moved as, for example, by a crane, into the pool area, at which time they may be lowered to rest upon a base support 20 comprising a horizontal support plate 22 provided with openings 24 which communicate with the open bottom of each shroud tube and with the spaces therebetween. This permits water from the pool to rise to the level of its surface in each of the shroud tubes and intervening storage spaces so as to surround the individual spent fuel cells therein.

The platform 22 rests upon support bars 26, which in turn rest upon the floor 10 of the pool. Preferably each rack made up of an assembly of shrouds is provided with seismic wall braces 30.

Referring now to FIG. 6, there is shown a perspective view of a single shroud tube 16, each of which is preferably provided with a cap 32 having outwardly flaring walls 34 to facilitate lowering of bundles of spent fuel cells into the individual tube. Each tube is preferably provided on its side walls with reinforcing ribs 36. In FIG. 7 there is illustrated a fragmentary portion of a side wall 38 of a shroud tube composed of an inner rectangular tubular member 40 and an outer tubular member 42, also of square cross section. The tubes having the side walls 40 and 42 are radially spaced to provide a space 44 which receives a suitable neutron absorbing [material] *panel* 46 which may, for example, [be] *contain* boron carbide *between aluminum sheets* as described in prior U.S. Pat. No. 4,006,362.

The means for assembling a multiplicity of shroud tubes together in the checkerboard formation with the requisite strength and rigidity comprises a multiplicity of splines or brackets 50 together with an egg crate structure indicated generally at 52. Splines 50, as best illustrated in FIG. 5, comprise a multiplicity of arms 50a, 50b, 50c and 50d, where the adjacent corners of diagonally adjacent shroud tubes 16 are assembled together. It will be observed that arms 50a and 50d of the spline 50 are welded as indicated at 53 to the outer tube 42 of one of the tubes 16 and arms 50b and 50c are welded as indicated at 54 to the outer wall 42 of the diagonally adjacent tube 16. The splines 50 are of limited length so as to provide adequate support between adjacent shroud tubes but at the same time to permit use of one or more egg crate support structures as will now be described.

As best seen at the upper left in FIG. 5, the spline arms 50a and 50c are flat and are offset with respect to each other, as are arms 50b and 50d. This permits assembly of the modules 16 into rows which are spaced apart only by the thickness of the strips 60, which may thus be considerably thinner than the thickness of arms 50a, 50b, 50c and 50d, and in consequence provide strong and solid connections between the diagonally adjacent modules while reducing the lateral spacing between adjacent rows of modules.

Figure 8:
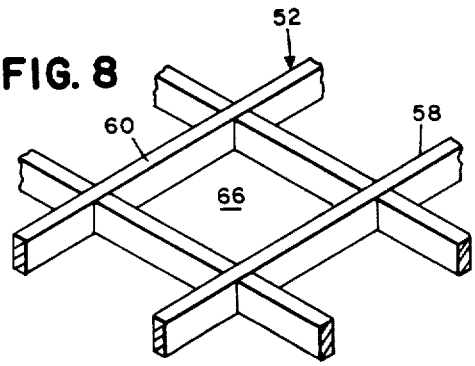
FIG. 8 is a view of an egg crate construction which may be used to assist in the assembly of shroud tubes.
Figure 9:
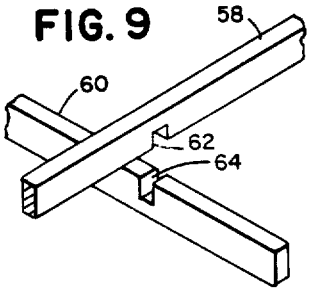
FIG. 9 is a detailed perspective view showing the manner in which the elongated elements of the egg crate are interfitted.

Referring now to FIGS. 8 and 9, each of the egg crate constructions comprises a reticulated arrangement of elongated bars or strips 58 and 60 as best seen in FIG. 9. Bars 58 are provided with notches 62 in their lower edge and bars 60 are provided with notches 64 in their upper edge which interfit to produce the structure illustrated in FIG. 8. It will thus be seen that the egg crate structure defines a multiplicity of rectangular openings 66 in alternate ones of which are received the elongated shrouds or spent fuel storage modules.

Referring now to FIG. 5, it will be observed that the individual strips 58 and 60 extend across the entire assembly of storage modules intermediate the reinforcing ribs 36, and intermediate and above the spline connectors 50.

Referring now to FIGS. 1 and 4, it will be observed that the assemblies made up of the individual shrouds or fuel storage modules 16 are surrounded by suitable diagonal braces 70.

The splines 72 provided at the outer side of a storage rack have only three arms indicated at 72a, 72b and 72c.

With this arrangement a number of vertically elongated storage spaces are provided which is substantially less than the number of shrouds or storage modules required. As the number of storage modules in a single rack increases, the proportion of available storage spaces provided between adjacent modules also increases.

The present design utilizes the unique spent fuel storage modules disclosed in U.S. Pat. No. 4,006,362. Each of these modules comprises radially spaced inner and outer tubes 40, 42 preferably formed of [aluminum] *stainless steel as disclosed in said prior patent* and provided at all four sides thereof with a [material] *panel* 46 effective to absorb slow neutrons. Preferably the neutron absorbing material contains boron carbide and is completely sealed so as to prevent the pool water from contacting the boron carbide of the absorber material. The racks are assembled into any desired array by using modules in every other storage position, thus providing a checkerboard arrangement. The positions between adjacent modules are used for fuel bundle storage by use of the X-shaped elongated spline members which space the shroud tubes apart and provide substantially continuous corner supports for the fuel bundles. A center to center spacing between stored fuel bundles in a practical embodiment of the present invention is approximately 6½ inches, while providing one wall of neutron absorbing material between all adjacent storage positions within a rack assembly.

The modules are held together structurally by the two lattice work egg crate support grids, and also by welding the modules to the support base. One support grid is provided just below the top of the modules and the other is as the mid height of the rack. The diagonal bracing on the outside faces of the rack connect the upper and mid support grids to one another and to the base for rigidity and horizontal stability.

The base includes brackets for receiving suitable floor bolts and bearing pads for resting on the pool floor, the openings 24 in the floor plate 22 providing for ample coolant flow to each fuel bundle.

The spent fuel storage modules described above in a practical embodiment of the invention comprise inner and outer tubes formed to aluminum alloy. The wall thickness of the inner tube is 0.060 inches and the wall thickness of the outer tube is 0.090 inches. The core of the sandwich or the intermediate material between the inner and outer tubes comprises four panels of a neutron absorber having an overall wall thickness of 0.105 inches including cladding at each side having a thickness of 0.020 inches and contains a material including a 50% concentration of boron carbide.

It will be understood that the racks are formed of storage modules having a length sufficient to receive spent fuel rods having a length in excess of 14 feet. Despite the relatively great length of the modules and the corresponding relatively greater height of the racks, the provision of the elongated spline connectors, the lattice or egg crate support structures, and the diagonal bracing provides an assembly of sufficient rigidity to be handled by conventional equipment such as, for example, overhead cranes and the like.

The arrangement of spent fuel modules may perhaps be more accurately described as a checkerboard pattern as considered in cross section in which all the modules are arranged in rows and in which in each row the modules occupy only alternate squares of the pattern and leave the remaining squares vacant the modules in each row being staggered with respect to the modules in adjacent rows.

With this arrangement, at the interior of the array of modules each vacant space is surrounded on four sides by modules, so that with both modules and vacant spaces receiving spent fuel cells, no cross radiation between fuel cells or bundles in any module or vacant space can take place with respect to fuel cells or bundles in adjacent modules or vacant spaces. At the outer edges of an array of modules, vacant space defined on three sides by modules, and on the fourth side by the egg crate lattices and/or exterior bracing may receive spent fuel cells safely, since outward emission does not result in the undesired cross radiation.

What I claim as my invention is:

1. A storage rack for receiving spent nuclear fuel cells comprising an egg crate grid formed of a multiplicity of elongated flat strips rigidly interconnected with their long dimensions horizontal and their width dimension vertical, said strips being at right angles to each other defining a multiplicity of square openings spaced apart by the thickness of said strips and forming a checker board pattern consisting of a first parallel series of openings and a second parallel series of openings perpendicular to said first series, a multiplicity of vertical tubular open-ended modules each of which comprises inner and outer [alumi-num] *metal* tubes and *panels containing* neutron absorbing material fitted between said inner and outer tubes, said modules having flat side walls and dimensioned to fit tightly into openings in said grid, said modules being provided only in alternate openings in each row of grid openings with the modules in one row staggered with respect to the modules in the adjacent rows so that the modules leave open spaces in said grid between modules at opposite sides thereof, and splines rigidly interconnecting diagonally adjacent modules, said splines having oppositely extending flat offset arms engaging the oppositely facing flat sides of diagonally adjacent modules while providing for lateral spacing between adjacent rows of modules as determined by the thickness of the strips of said egg crate grid, of less than the thickness of said spline arms, said spline arms being metallurgically bonded to the outer walls of said modules.

2. A rack as defined in claim 1, in which a plurality of egg crate grids are provided in vertically spaced relation, and said splines are provided both above and below an intermediate grid.

3. A rack as defined in claim 2, in which one grid is provided adjacent the top of said rack, a second grid is provided substantially intermediate the ends of the rack, and a horizontal flat support plate to which the lower ends of said modules are secured to provide a rigid assembly.

* * * * *